S. J. REED.
Sulky Plow.
No. 80,221. Patented July 21, 1868.
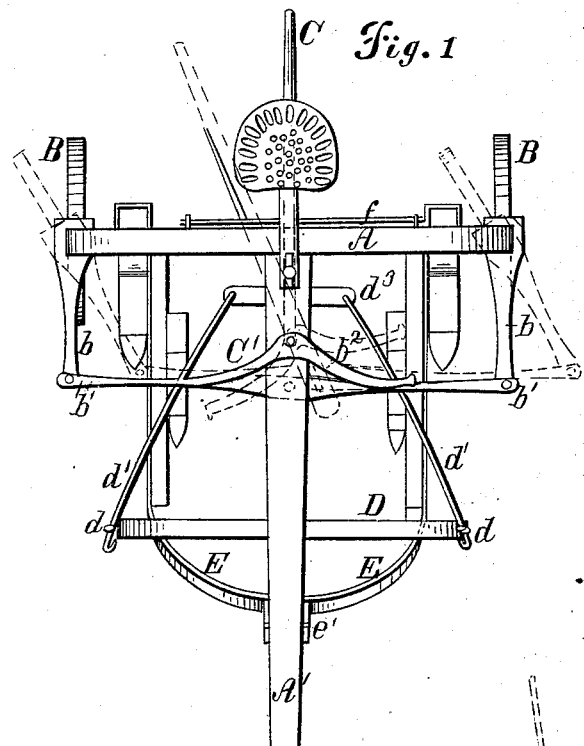
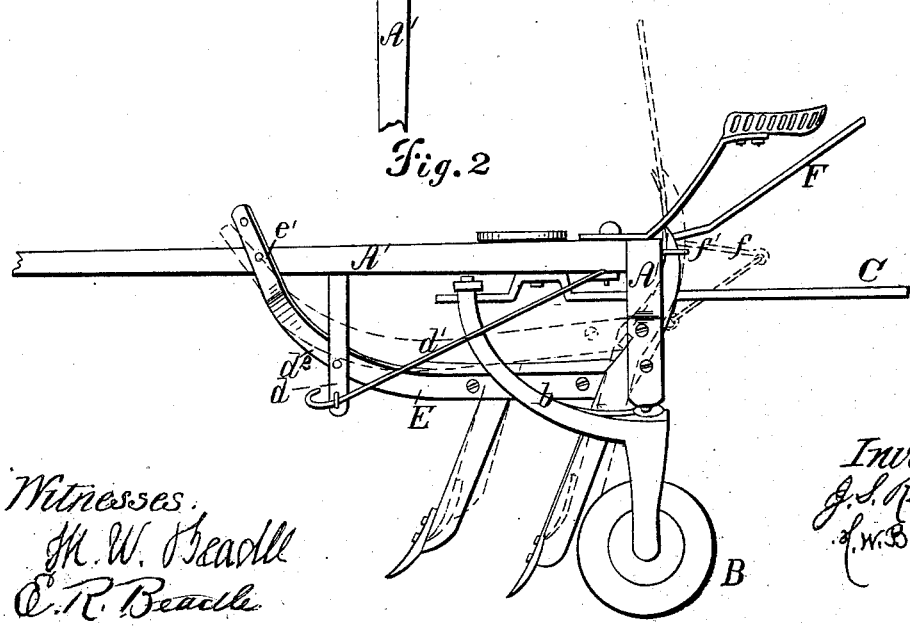

United States Patent Office.

SAMUEL J. REED, OF CAMDEN, OHIO.

Letters Patent No. 80,221, dated July 21, 1868.

---

IMPROVEMENT IN SULKY-PLOWS.

---

The Schedule referred to in these Letters Patent and making part of the same.

---

TO ALL WHOM IT MAY CONCERN:

Be it known that I, SAMUEL J. REED, of Camden, in the county of Preble, and State of Ohio, have invented a new and improved Sulky-Plow; and I do hereby declare that the following is a full and exact description of the same, reference being had to the accompanying drawings, and to the letters of reference marked thereon.

This invention relates to certain improvements in sulky-plows, and consists principally in the devices for elevating the plows from the ground, and also in the arrangement whereby the plows are properly guided, all of which will be fully described hereinafter.

Figure 1 represents a plan view, and
Figure 2 a side elevation of my improved plow.

In the drawings—

A represents the frame of the plow, which is constructed of a single beam, with curved ends, upon the latter of which are placed the caster-wheels B B.

A' represents the pole, which extends forward from the centre of the beam A.

$b\ b$ represent arms, attached to caster-wheels B B, which extend forward and upward, and are attached to the cross-bar $b^1$.

In the centre of this cross-bar, and upon its under side, is a pin, $b^2$, over which is placed the slot of lever C, as shown. The lever C is pivoted upon a shaft, which extends up through the pole A', and terminates in the foot-piece C'. By this arrangement, the caster-wheels may be turned, and the plows thus easily guided in the desired direction by the driver pressing with the proper foot the foot-piece; or it may be operated from behind, by a person walking, through the medium of lever C.

D represents a bar, bent in a half oval shape, which is attached to the pole A'.

$d\ d$ represent eyes, placed at its lower end, through which pass rods $d^1\ d^1$. These eyes may be adjusted higher or lower in the bar D by means of holes, $d^2$, as may be necessary. The rods $d^1\ d^1$ are provided with hooks, or other suitable means for fastening, at the forward end, by which means the team is attached to the plow. The rear ends are fastened to the short bar $d^3$, which is pivoted to pole A', as shown. By this arrangement, the draught is equalized.

E E represent the plow-beams, which are also adjustable, by means of the screws or bolts $e'$. By this arrangement, the forward ends of the plow-beams are raised or lowered, for deep or shallow plowing. The rear ends are elevated, when desired, by means of the lever F, attached to the double crank $f$, the arms of which latter are attached by ropes, as shown, to the rear ends of the plow-beams.

The standard of the rear plow, upon each beam, extends upward, and is held from lateral movement by means of the guides $f'$.

From this description, the operation of my invention will be readily understood. The team having been attached to rods $d^1$, which latter should be properly adjusted to secure the desired draught, motion is given to the plow.

The plowman, whether riding or walking, can guide the plow close to the hills of corn, or other grain, without fear of injuring it. The plow may also be easily adjusted in front, and elevated in rear, by the devices described. The arrangement for attaching the team entirely relieves them from the weight of the pole upon their necks. The facility with which this arrangement is guided will be found especially advantageous upon hill-sides, when the plows have a tendency to slide off. By keeping the wheels obliquely to the line of the crop, this tendency will be overcome.

Having thus fully described my invention, what I claim as new, and desire to secure by Letters Patent, is—

1. The beam A, pole A', caster-wheels B B, arms $b\ b$, cross-bar $b^1$, lever C, and foot-piece C', the whole being combined and arranged substantially as described.

2. The plow-beams E E, constructed and arranged as described, in combination with lever F, crank $f$, and guides $f'$, as and for the purpose set forth.

This specification signed and witnessed, this twenty-fifth day of April, 1868.

SAMUEL J. REED.

Witnesses:
ROBERT CONARROE,
J. M. SHEAFER.